VIDEO DISPLAY SYSTEM

INVENTOR.
*Marvin Camras*

BY *Hill, Sherman, Meroni, Gross & Simpson*
ATTORNEYS

INVENTOR.
Marvin Camras
BY
Hill, Sherman, Meroni, Gross & Simpson
ATTORNEYS

United States Patent Office 3,429,995
Patented Feb. 25, 1969

3,429,995
VIDEO DISPLAY SYSTEM
Marvin Camras, Glencoe, Ill., assignor to IIT Research Institute, a corporation of Illinois
Original application Aug. 5, 1960, Ser. No. 47,741. Divided and this application Oct. 13, 1965, Ser. No. 495,495
U.S. Cl. 178—7.3 8 Claims
Int. Cl. H04n 3/00, 3/16, 5/38

ABSTRACT OF THE DISCLOSURE

An area scanning system comprising first and second series of cores which are sequentially switched by means of alternating polarity magnetomotive forces of cooperating waveform exerted on each core to eliminate retrace switching. Capacitance associated with the core output windings produces an oscillatory wave train for exiting luminescent material.

*Cross-reference to related application*

The present application is a division of my copending application Ser. No. 47,741 filed Aug. 5, 1960, now abandoned.

This invention relates to a visual display system for translating time varying video signals into a moving image and particularly relates to a video display device which may have a relatively small thickness dimension. The system utilizes a plurality of series of magnetic cores which are switched from one polarity of saturation to another at different rates and in a predetermined sequence to control the scanning of the area of the display device.

An important object of the invention is to provide a video display device having an efficient and economical area scanning system.

A further object of the invention is to provide a video display device which may be very compact and rugged and have a very small thickness dimension so as to be adapted to be mounted on the wall of a room.

Other objects, features and advantages of the present invention will be apparent from the following detailed description taken in connection with the accompanying drawings, in which.

Figure 1:
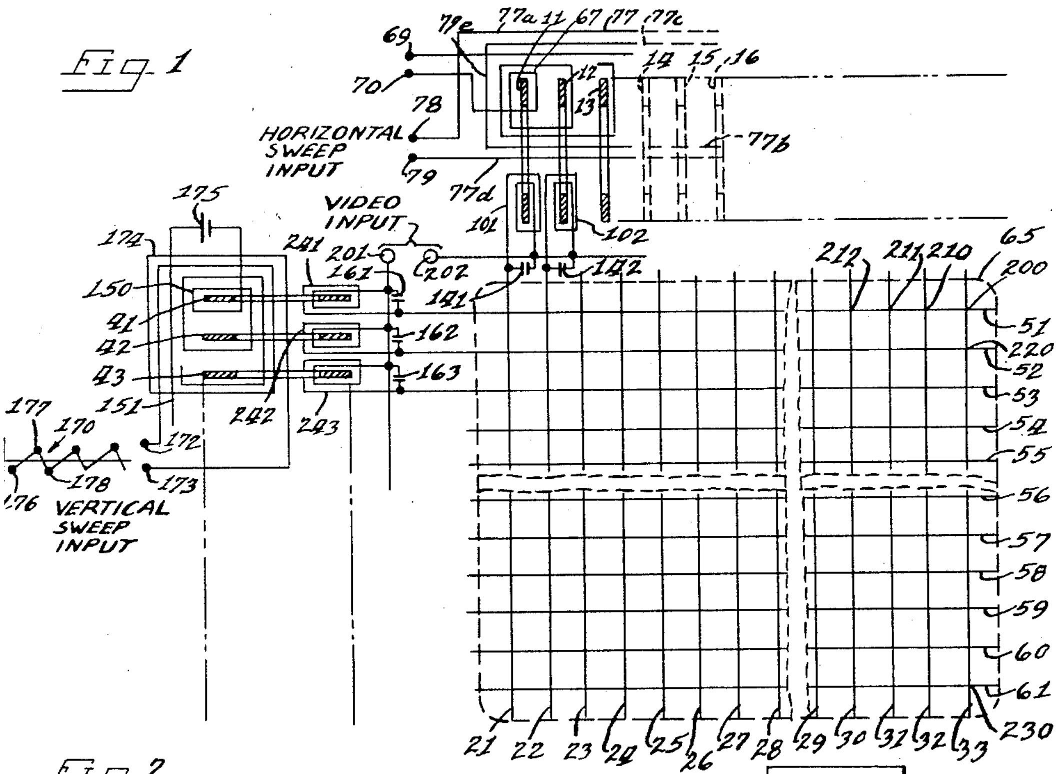
FIGURE 1 is a diagrammatic illustration of an area scanning system in accordance with the present invention which may be utilized in the mural display of video signals.
Figure 2:
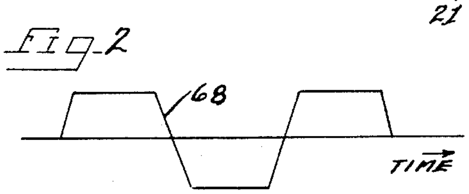
FIGURE 2 illustrates the current waveform supplied to the graded winding for the horizontal sweep of the system of FIGURE 1.

FIGURE 1 is a diagrammatic illustration of an area scanning system in accordance with the present invention. The system utilizes a series of horizontal cores such as indicated at 11–16 which are coupled to respective vertical wires such as indicated 21–33. The series of cores such as 11–16 controls the sequential energization of wires 21–33 and thus may be termed part of the horizontal sweep assembly of the system. A vertical series of cores such as indicated at 41–43 constitute part of the vertical sweep assembly of the scanning system and are associated with respective horizontal wires such as indicated at 51–61. During a first sequential energization of wires 21–33, wire 51 may be energized by the vertical sweep assembly, while upon a second sequential energization of the vertically extending wires, horizontal wire 52 may be energized by the vertical sweep assembly. In this manner successive horizontal scanning lines are traced on the display screen 65. In conformity with U.S.A. television standards, there may be a total of 512 cores such as 11–16 in the horizontal sweep assembly associated with a corresponding number of vertical wires such as 21–33, and there may be 493 cores such as 41–43 in the vertical sweep assembly with a corresponding number of horizontal wires such as 51–61. (The number 493 allows for a 6% blank period in a 525 line system.) A linearly graded winding 67 has been indicated as linking cores 11–16 etc. with progressively fewer numbers of turns. A bias current waveform such as indicated at 68 in FIGURE 2 is supplied to terminals 69 and 70 to energize the graded winding 67. The graded winding 67 is shown linking only the first three cores 11–13, but of course the winding pattern is extended in practice so as to link the total number of cores such as 512 cores with progressively fewer numbers of turns between terminals 69 and 70. Since the successive cores 11–16 have successively different numbers of turns of the graded winding linking them, successively different magnetizing forces are supplied to the successive cores and this has been indicated diagrammatically in FIGURE 4 for the case of five magnetic cores, the first of which receives a maximum magnetomotive force of four ampere turns, the second three ampere turns, the third two ampere turns, the fourth one ampere turns and the fifth having no graded winding linking it. The variations in magnetomotive force for the first four of such a series of five cores is indicated by waveforms 71–74 in FIGURE 4.

Figure 5:
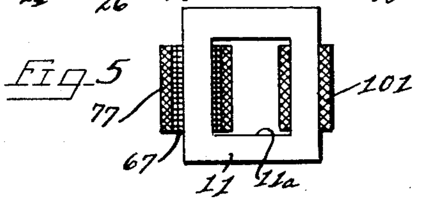
FIGURE 5 is a diagrammatic illustration of an individual core of the type used in the system of FIGURE 1 for both the horizontal sweep and the vertical sweep and showing horizontal sweep windings in section diagrammatically.
Figure 3:
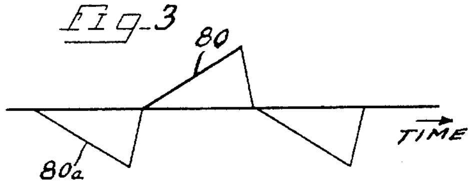
FIGURE 3 illustrates the current waveform supplied to the common winding of the horizontal sweep for the system of FIGURE 1.
Figure 6:
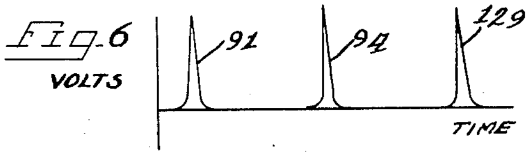
FIGURE 6 is a diagrammatic illustration of exciting voltage pulses which are generated by the horizontal or vertical sweep circuits of FIGURE 1 in the absence of sufficient capacitance across the output windings of the respective series of cores.
Figure 4:
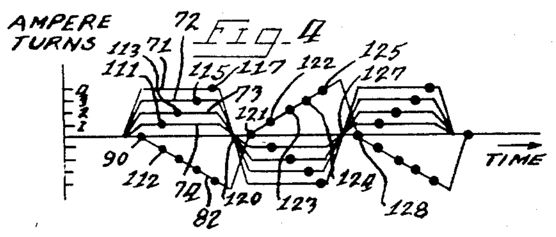
FIGURE 4 is a composite diagram illustrating the manner in which the waveforms of FIGURES 2 and 3 coact to switch the magnetic cores of the horizontal sweep sequentially through saturation condition to scan a horizontal line of the display device.

A horizontal sweep winding of the horizontal sweep assembly is indicated at 77 and connected between terminals 78 and 79 which receive the current waveform indicated at 80 in FIGURE 3. The portions of the horizontal sweep winding 77 are indicated at 77*a*, 77*b*, 77*c* and 77*d*. The winding is of helical configuration and links a leg of each of the cores 11–16, etc. in common. Thus, conductor 77*a* may extend at the outside of the cores along the entire length of the horizontal sweep assembly and be connected with conductor 77*b* at the right hand end of the assembly. Conductor 77*b* may extend through the center opening of each of the successive cores and be connected with conductor portion 77*c* at the left hand end of the assembly by means of a connecting conductor portion 77*e*. Conductor portion 77*c* will then extend along the length of the series of cores at the exterior of the cores and be connected at the right hand end of the assembly as viewed in FIGURE 1 with conductor portion 77*d* which then extends through the central apertures of the successive cores and leads to terminal 79. FIGURE 5 illustrates a rectangular type core with a central opening 11*a* which may be utilized in the horizontal and vertical sweep assemblies. Since sweep winding 77 links each of the cores with the same number of turns, the magnetomotive force exerted on the individual cores varies as indicated by waveform 82 in FIGURE 4 in each of the cores. The polarities of the magnetizing forces produced by the graded winding waveform 68 and the sweep winding waveform 80 are of opposite polarity during a major portion of each cycle as indicated in FIGURE 4 so that the graded winding magnetizing force and sweep winding magnetizing force in each core cancel each other at a given instant of time in each cycle of the waveforms 68 and 80. Thus, at the instant of time represented by point 90 in FIGURE 4, the fifth core is being switched from a positive saturation condition to a negative saturation condition so as to generate a voltage pulse such as indicated at 91 in FIGURE 6 in an output winding such as output windings 101 and 102 of the horizontal sweep assembly in FIGURE 1. At a succeeding instant of time as represented by points 111 and 112 in FIGURE 4, the sweep and graded winding magnetizing forces in the fourth core will be equal and opposite to shift the fourth core from a positive saturation condition to a negative saturation condition and thus to generate a further voltage pulse such as indicated at 94 in FIGURE 6.

At the instant of time represented by points 111 and 112 in FIGURE 4, the fourth core of the series of five cores diagrammatically represented is switching from positive to negative saturation. Similarly at times corresponding to points 113 and 114, 115 and 116, and 117 and 118, the third, second and first cores of the series, respectively, are being switched from positive to negative saturation.

During the next half cycle of the waveform of FIGURE 4, the phase relation of waveforms 68 and 80, FIGURES 2 and 3, is such that the graded winding 67 is receiving a negative saturating current to maintain the fourth, third, second and first cores of the series of five cores represented in FIGURE 4 in a negatively saturated condition as the sweep waveform 80 drops to zero. Thus referring to FIGURE 4, the magnetizing forces for the first through fourth cores represented by curves 71–74 in FIGURE 4 drop to a zero value and then become negative at a time represented by point 120 in FIGURE 4 which is prior to the time when the sweep magnetomotive force represented by curve 82 reaches zero at point 121. At point 121 on curve 82, the fifth core of the series of cores represented in FIGURE 4 which has no graded winding turns thereon is switched from negative to positive saturation. Thereafter at times corresponding to points 122–125 on waveforms 82, the fourth, third, second and first cores of the series of cores represented in FIGURE 4 are switched from negative to positive saturation.

At the end of this half cycle of the waveform of FIGURE 4, curves 71–74 move from negative to positive polarity at point 127 prior to the time when the sweep waveform 82 shifts from positive to negative polarity through point 128 so that the cores represented by the curves of FIGURE 4 remain positively saturated during the reversal of polarity of waveforms 71–74. Beginning at point 128, the fifth core of the series of cores represented is switched from positive to negative polarity saturation and the cycle is repeated.

Applying the principles represented in FIGURES 2, 3 and 4 to the horizontal sweep assembly of FIGURE 1, it will be apparent that the series of cores 11–16, etc. are switched in sequence beginning with the core having the fewest graded winding turns thereon. As illustrated diagrammatically in FIGURE 1, core 11 would have the maximum number of graded winding turns thereon and would be switched last in each half cycle.

In the embodiment of FIGURE 1, the applied alternating square wave supplied to graded winding terminals 69 and 70 may have a frequency of 7,875 cycles per second to switch the horizontal series of cores 11–16 etc. from one polarity of saturation to the other 15,750 times per second. As represented in FIGURE 4, during each full cycle of the waveform 68, each core is switched from positive to negtaive saturation and then from negative to positive saturation and thus is switched twice each cycle of the waveform 68. The output windings of the horizontal sweep assembly such as indicated at 101 and 102 thus deliver pulses such as indicated at 91, 94 and 129 in FIGURE 6 to respective ones of the vertical wires 21–33, etc. in sequence to scan the vertical wires beginning with the wire at the extreme right of the horizontal sweep assembly as illustrated in FIGURE 1. By way of example, pulse 91 might be applied by the output winding from core 13 to vertical wire 23, pulse 94 might be supplied to wire 22 by output winding 102, and pulse 129 might be supplied to vertical wire 21 by output winding 101. By introducing a suitable amount of capacitance in parallel across the windings such as 101 and 102 and succeeding windings as indicated by capacitors 141 and 142 in FIGURE 1, the pulse output as indicated at 91, 94 and 129 in FIGURE 6 becomes a succession of damped wave trains as indicated at 91′, 94′ and 129′ in FIGURE 7, the successive trains being initiated by switching of cores 13, 12 and 11, for example, in that order.

Because of the higher scanning rate of the horizontal series of cores, the cores will have a smaller cross section and be thinner than the vertical series of cores indicated at 41–43, etc., and will have fewer numbers of turns on the successive output windings such as 101, 102, etc. The capacitance as indicated at 141, 142 can be built into the system as distributed capacitance of the display system 65 and/or of the output windings such as 101, 102. The damped wave train output as indicated at 91′, 94′, and 129′ increases the efficiency of light output where an electroluminescent material is interposed between the vertical wires such as 21–23 and the horizontal wires such as 51–61 for providing a visual output at the display 65.

Figure 7:
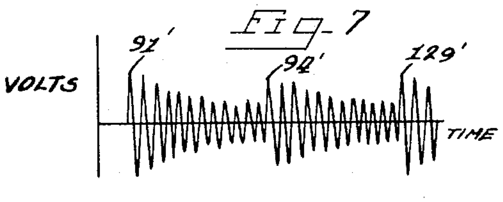
FIGURE 7 illustrates the voltage waves generated by the horizontal and vertical sweep circuits of FIGURE 1 when sufficient capacitance is provided across the output windings of the circuits.

The vertical series of cores 41–43, etc. may receive a graded winding as indicated at 150 which links the successive cores 41–43 and succeeding cores with progressively fewer turns in the same manner as the horizontal series of cores and linearly graded winding 67. A break in the winding 150 has been indicated at 151 to indicate that the winding in practice would link each of the successive cores of the vertical series with progressively fewer turns. Capacitors 161–163 have the function of producing wave trains as shown in FIGURE 7 as each core is switched, and this capacitance may be provided in the same ways as described for capacitors 141 and 142 of the horizontal sweep assembly.

A vertical sweep waveform as indicated at 170 may be applied to the vertical sweep input terminals 172 and 173. This vertical sweep waveform linearly increases from a maximum negative value to a maximum positive value and then abruptly returns to maximum negative value. This sweep waveform is applied to a winding 174 which links all of the cores of the vertical sweep assembly in common with the same number of turns. One series of cores having the graded winding 150 receives direct current from a direct current source 175 so that this series of cores is biased with progressively increasing values of positive bias magnetization. A second series of cores is biased with progressively increasing magnitudes of negative magnetization. For example, a direct current source of polarity opposite to the polarity of source 175 may supply a second graded winding similar to that indicated at 150 which links the second series of cores of the vertical sweep assembly with progressively increasing numbers of turns. In this case, the last core of the second series might have a maximum number of turns of the second graded winding thereon equal to the number of turns linking core 41 so as to produce a negative bias magnetization of maximum value for this core. By applying the waveform 170 to the sweep winding 174 which links all of the cores in common both the positively biased and the negatively biased cores, at the maximum negative point of the sweep waveform indicated at 176 for example, all of the cores would be negatively saturated. At a succeeding instant of time, core 41 would be switched from negative saturation to positive saturation, and then the succeeding cores 42, 43, etc. of the positively biased series would be switched to positive saturation. After this, the least negatively biased core would be switched to positive saturation as the sweep input waveform 170 became positive and so on until at the peak of the waveform 170 as indicated at 177 all of the cores of the vertical sweep assembly would be positively saturated. In the return portion of the sweep waveform, all of the cores would be returned to negative saturation in preparation for a new cycle.

Thus, at a point such as indicated at 178 on waveform 170 where the waveform is again at a negative maximum, all of the vertically arranged cores 41–43, etc. would be negatively saturated. Core 41 would then be switched from negative saturation to positive saturation again as waveform 170 linearly increases in value from its negative maximum point 178. In order to scan the entire display area 65 at the rate of 30 frames per second, it is neecessary for the waveform 170 to have a repetition rate of 30 cycles per second. For interlaced scanning a vertical sweep frequency of 30 cycles per second provides 60 half-scans per second of the area of display 65. For interlaced scanning a first group of alternate cores in the vertical sweep assembly would be activated in succession after which a second group of alternate cores would be activated during a second downward scan to simulate interlace scanning. Since the cores such as 41–43 having positive values of bias magnetization are switched first, this group of cores could be scanned during a first half-scan, while the negatively biased cores would alternate with the cores 41–43, etc. and be scanned during the second half-scan. In this event, the core having the least number of graded turns of the negatively biased series could be disposed between cores 41 and 42, the next negatively biased core having the next fewest number of graded turns would lie between cores 42 and 43 and so forth. The first core of the negatively biased series would of course have its output winding connected to a horizontal wire lying between horizontal wires 51 and 52, while the second negatively biased core would have its output winding connected to a horizontal wire between wires 52 and 53 in FIGURE 1.

It will be seen that with the scanning arrangements described, wires such as 33 and 51 will be activated at the initial scanning instant to apply a voltage at region 200 where these wires intersect. Added to this triggering voltage between the wires 33 and 51 is the video input at terminals 201 and 202 and any desired bias voltage for the mural display screen wires. For example, in the case of an electroluminescent material between the horizontal and vertical wires, a bias may be supplied to terminals 201 and 202 to apply a potential between the horizontal and vertical wires just below the threshold for light emission from the screen 65 taking into account the maximum video signal applied to the terminals 201 and 202. Thus, the amount of light emitted from region 200 at the first instant of a scanning cycle will be a function of the video intensity at that instant as applied to terminals 201 and 202. At successive scanning instants, successive regions such as 210, 211 and 212, etc. along conductor 51 will be scanned, after which point 220 and successive points along the second conductor 52 will be scanned. Toward the end of the active part of a first scanning cycle, (corresponding to the region between points 176 and 177, for example, of waveform 170) the bottom line of the display area will be scanned, for example along conductor 61 from right to left beginning with region 230 where wires 33 and 61 intersect. At the beginning of the active part of the next scanning cycle (corresponding, for example to points 178 of waveform 170) the points along conductor 51 beginning with region 200 are scanned again from right to left as viewed in FIGURE 1. The video input signal at terminals 201 and 202 must, of course have been generated by scanning an image from right to left, and top to bottom, over the same time period as the scanning of the display area 65 in order to recreate the visual image on the display area. Of course, if scanning originally is from left to right, it is merely necessary to turn the display area 65 from left to right and observe the present undersurface of the screen. By suitable arrangement of the windings on the cores of the horizontal and vertical sweep assemblies, any desired sequence of scanning of the cores may be obtained in conformity with the characteristics of the video signal to be displayed.

It will be understood that the display of television images by a system as indicated in FIGURE 1 on a large area with minimum thickness and using a self-luminous screen such as represented at 65 is ideal since the mural display could be hung on a wall in the same way as a painting is at present. A major unsolved problem in developing such a mural display device for television signals heretofore has been the lack of an inexpensive means for scanning such as area display, which problem is overcome by the present invention.

It may be noted that the bias supplied to terminals 201 and 202 depends on the display screen characteristics and may be direct current or alternating current, for example radio frequency current, and the bias may be varied throughout the sweep cycle to compensate for edge effects and other distortions. The junction between energized horizontal and vertical wires will then have a summation of voltages of (1) the pulse or wave train from one of the output windings 101, 102 etc. of the horizontal series of cores, (2) the pulse or wave train from one of the output windings 241–243, etc. of the vertical series of cores, (3) the video signal applied to terminals 201 and 202, and (4) any screen bias which may also be applied to terminals 201 and 202. Unless pulses or wave trains from one of the output windings such as 101, 102, etc. and from one of the windings 241, 242, 243, etc. are present, the light output from the screen will be negligible because of the nonlinear response characteristics of the screen.

Experimental work has indicated that 63 microsecond pulses can be generated by the system of FIGURE 1 at intervals of 33,333 (or 16,667) microseconds with a slight degree of overlap and with the pulses occurring in proper succession. Pulses of 170 volts peak to peak were obtained. In television service, each element is energized for about 0.2 microsecond at intervals of $1/30$ second. The duty cycle is $^{0.2}/_{33,333}$ or .0000067. The peak output of light would therefore have to be extremely high to give moderate average illumination; or else there must be some kind of storage as for example in the inherent capacitance of the elements, or as fluorescence. The effect of storage can persist for about $1/30$ second.

By using the output pulse from the successive cores to shock-excite a resonant circuit to give a train of damped oscillations as indicated in FIGURE 7, a much more efficient utilization of electroluminescent materials is obtained.

In order to show a typical arrangement of graded windings for FIGURE 1, the number of turns on the successive cores for a television scanning display system are tabulated below for the case where the even numbered cores are scanned during the negative parts of the active sweep cycle and the odd numbered cores are scanned during the positive part of the active sweep cycle. For convenience, cores 41, 42 and 43 will be designated cores number 2, 4 and 6 in view of the fact that these cores are shown in FIGURE 1 as being positively biased with progressively decreasing numbers of turns of the graded winding thereon.

The tabulation is as follows:

TABLE I.—WINDING PATTERN FOR THE TELEVISION MURAL DISPLAY SYSTEM OF FIGURES 1-7 USING INTERLACED SCANNING (A) Horizontal Sweep Assembly

| Core No. (Counting in Order from Right to Left in Figure 1) | Core Reference Number in Figure 1 | Associated Vertical Wire in Figure 1 | No. of Turns of Graded Winding 67 in Figure 1 |
|---|---|---|---|
| 1 | | | 0 |
| 2 | | | 1 |
| 3 | | | 2 |
| 4 | | | 3 |
| 5 | | | 4 |
| . | . | . | . |
| . | . | . | . |
| . | . | . | . |
| 255 | | | 254 |
| 256 | | | 255 |
| 257 | | | 256 |
| 258 | | | 257 |
| 259 | | | 258 |
| 260 | | | 259 |
| . | . | . | . |
| . | . | . | . |
| . | . | . | . |
| 508 | (15) | (25) | 507 |
| 509 | (14) | (24) | 508 |
| 510 | (13) | (23) | 509 |
| 511 | (12) | (22) | 510 |
| 512 | (11) | (21) | 511 |

(B) Vertical Sweep Assembly (For Interlaced Scanning)

| Core No. (Counting in Order from the Top Down in Fig. 1) | Core Reference Number in Figure 1 | Associated Horizontal Wire in Figure 1 | No. of Turns of Graded Winding 150 |
|---|---|---|---|
| 1 | | | 0 |
| 2 | (41) | (51) | 262 |
| 3 | | | −1 |
| 4 | (42) | (52) | 261 |
| 5 | | | −2 |
| . | . | . | . |
| . | . | . | . |
| . | . | . | . |
| 254 | | | 136 |
| 255 | | | −127 |
| 256 | | | 235 |
| 257 | | | −128 |
| 258 | | | 134 |
| 259 | | | −129 |
| 260 | | | 133 |
| 261 | | | −130 |
| 262 | | | 132 |
| 263 | | | −131 |
| 264 | | | 131 |
| . | . | . | . |
| . | . | . | . |
| . | . | . | . |
| 355 | | | −177 |
| 356 | | | 85 |
| 357 | | | −178 |
| 358 | | | 84 |
| 359 | | | −179 |

For highest resolution 500 or more cores and related elements may be used in the vertical sweep assembly. For commercial purposes about 360 cores and related elements are satisfactory. The sweep current function is adjusted so that all the elements are used for the useful picture cycle, and none are wasted during the blanking or return. Excitation as shown by waveforms 68 and 80 in FIGURES 2 and 3 is preferred if the "return sweep" is to be eliminated from the core system, the video input being adjusted accordingly.

It may be noted that Table I(B) is based on the omission of cores with numbers of turns between 84 turns of core number 358 and the zero turns of core number 1. Thus cores number 360 through number 525 are omitted in view of the blanking of the video signal to allow for a retrace in interlaced scanning. There are 83 even numbered cores (numbers 360, 362, 364 . . . 524) and 83 odd numbered cores (numbers 361, 363, 365 . . . 525) omitted in view of the retrace time which would otherwise be assigned numbers of turns 83, 82, 81 . . . 3, 2, 1 (for even numbered cores 360, 362, 364 . . . 520, 522, 524) and minus 180, minus 181, minus 182 . . . minus 260, minus 261, minus 262 (for odd numbered cores 361, 363, 365 . . . 521, 523 and 525, respectively).

Figure 8:
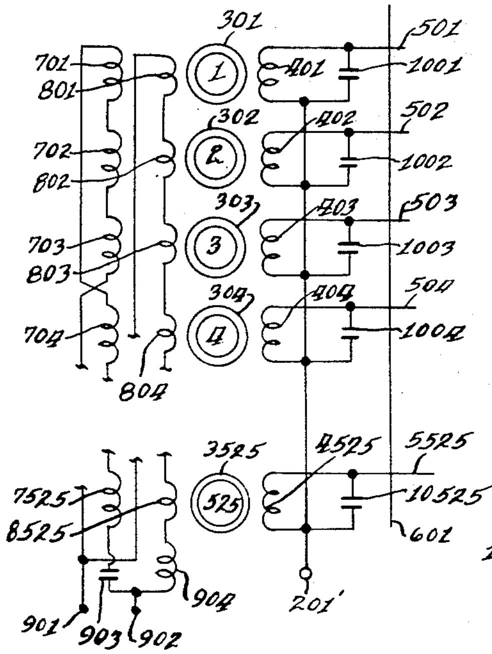
FIGURE 8 is a view similar to FIGURE 1 but illustrating the nature of the scanning system when sinusoidal excitation currents are supplied to oppositely graded windings on the cores of the horizontal and vertical sweep assemblies.

FIGURE 8 illustrates the utilization of two phase sinusoidal currents for scanning the successive wires of a mural display system such as shown in FIGURE 1. Thus, saturable cores 301–304 and 3,525 may represent a series of 525 cores for use either in place of the horizontal series of cores 11–13, etc. or the vertical series of cores 41–43, etc. in FIGURE 1. By way of example, output windings 401–404 and 4,525 of the cores may be connected to horizontal wires 501–504 and 5,525, and similar output windings of a similar series of cores may be connected to the vertical wires such as indicated at 601 in FIGURE 8. Two series of oppositely graded windings 701–704 and 7,525 and 801–804 and 8,525 are shown as coupled to the respective cores 401–404 and 4,525 for switching the cores in sequence as in the embodiment of FIGURE 1. For example, the vertical series of cores of FIGURE 8 may be energized to activate the horizontal lines 501–5,525 30 times a second to provide a line scanning rate of 15,750 lines per second in accordance with present television practice. The series of graded windings are energized from a suitable alternating current source at terminals 901 and 902 and the exciting currents for the respective series of graded windings may be 90° out of phase by virtue of phase shifting capacitor 903 in series with windings 701–7,525 and phase shifting inductor 904 in series with windings 801–8,525. The number of turns of the successive windings may be selected to give a 180° distribution of vectors in FIGURE 9, the vectors being assigned numbers $\overline{\mathbf{1}}$–$\overline{\mathbf{525}}$. The vectors in FIGURE 9 may be thought of as representing the net magnetizing force exerted on the respective cores which are correspondingly numbered 1–525. The vectors may be thought of as rotating in the counterclockwise direction at an angular velocity corresponding to the frequency of the excitation currents and the vertical component of the respective vectors may represent the instantaneous net magnetizing force exerted on the respective cores. Thus at the instant of time represented in FIGURE 9, core 302 which is designated core number 2 and corresponds to vector $\overline{\mathbf{2}}$ is about to be switched from positive saturation to negative saturation. At the next instant of time core 304 will be switched from positive to negative saturation and so on in sequence for the even numbered cores. One-fourth cycle later core 301 which is designated core number 1 and corresponds to vector $\overline{\mathbf{1}}$ will approach the horizontal axis of the diagram and be switching from positive to negative saturation after which the remaining odd numbered cores in sequence will switch from positive to negative saturation. 180 electrical degrees from the instant of time represented in FIGURE 9, core 302 represented by vector $\overline{\mathbf{2}}$ will be switching from negative to positive saturation. The vector diagram may be thought of as making 15 revolutions per second corresponding to an input frequency at terminals 901 and 902 of fifteen cycles per second. The vector diagram of FIGURE 9 will then carry out an interlaced scanning pattern wherein wires such as 502 and 504 are activated in sequence during a first subframe of scanning and thereafter wires such as 501 and 503 are activated in sequence for a second interlaced subframe to make a total of 30 complete frames per second. For the vector diagram of FIGURE 9, the vectors should make 15 revolutions per second corresponding to an input frequency at terminals 901 and 902 of 15 cycles per second since each core is switched twice in one revolution of the vector diagram. With the vector diagram of FIGURE 8, successive pulses of the same polarity are delivered to the lines 501–5,525 in one half revolution of the vector diagram after which pulses of the opposite polarity are delivered to the successive lines. The pulses may set up damped oscillations as indicated in FIGURE 7 by means of successive capacitors as indicated at 1001–1004 and 10,525 and the capacitance may be provided in the same ways as described for the embodiment of FIGURE 1.

Where the windings 701–7,525 and 801–8,525 are proportioned to give a vector diagram with a 360° distribution of vectors, the successive cores which are switched will deliver pulses of alternate polarity and the vector diagram would make 30 revolutions per second corresponding to an input frequency at terminals 901 and 902 of 30 cycles per second.

The horizontal sinusoidally excited scanning cores would be constructed from a similar vector diagram having 525 vectors corresponding to the respective cores distributed over either 180° or 360° to supply voltage pulses to the successive vertical wires such as indicated at 601. As with the vertical scanning system, the polarity of the initial pulse is not important where a damped wave train such as indicated in FIGURE 7 is to be generated at the successive vertical wires such as 601.

Figure 9:
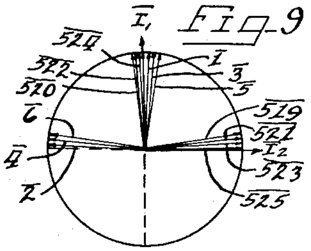
FIGURE 9 shows a vector diagram illustrating the operation of the system of FIGURE 8 when interlaced scanning is to be employed.
Figure 13:
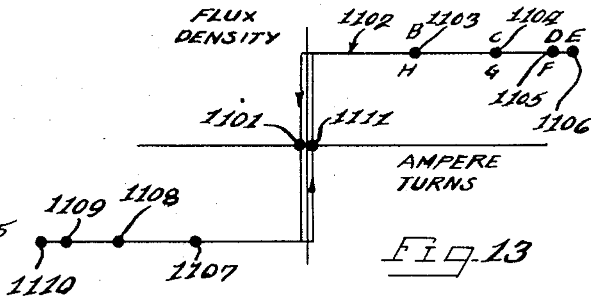
FIGURE 13 is a composite diagram illustrating the magnetic condition of successive cores at a given instant of time and the manner in which the magnetic condition of the cores varies as a function of time.

To give a specific example of sinusoidally graded windings for the case of an 180° vector diagram as in FIGURE 9, the following tabulation is presented:

TABLE II.—WINDING PATTERN FOR SINUSOIDALLY EXCITED TELEVISION SIGNAL MURAL DISPLAY SYSTEM OF FIGURES 8 AND 9

(A) HORIZONTAL SCANNING SYSTEM

| Core No. (In Order from Left to Right) | Associated Vertical Wires in Figure 8 | No. of Turns for Windings Receiving Current $i_1$ ($y$-$\pi$/525 radians) | No. of Turns for Windings Receiving Current $i_2$ ($y$-$\pi$/525 radians) |
|---|---|---|---|
| 1 | (601) | sin 524y | cos 524y. |
| 2 | | sin 523y | cos 523y. |
| 3 | | sin 522y | cos 522y. |
| 4 | | sin 521y | cos 521y. |
| 5 | | sin 520y | cos.520y. |
| ⋮ | ⋮ | ⋮ | ⋮ |
| 523 | | sin 2y | cos 2y. |
| 524 | | sin y | cos y. |
| 525 | | sin 0=0 | cos 0=1. |

(B) Vertical Scanning System

| Core No. (In Order from Top to Bottom) | (Core Reference Numbers in Figure 8) | (Associated Horizontal Wires in Figure 8) | No. of Turns For Windings 701–7,525 (Current $i_2$) | No. of Turns For Windings 801–8,525 (Current $i_1$) |
|---|---|---|---|---|
| 1 | (301) | (501) | cos 262y | sin 262y. |
| 2 | (302) | (502) | cos 524y | sin 524y. |
| 3 | (303) | (503) | cos 261y | sin 261y. |
| 4 | (304) | (514) | cos 523y | sin 523y. |
| 5 | | | cos 260y | sin 260y. |
| ⋮ | ⋮ | ⋮ | ⋮ | ⋮ |
| 262 | | | cos 394y | sin 394y. |
| 263 | | | cos 131y | sin 131y. |
| ⋮ | ⋮ | ⋮ | ⋮ | ⋮ |
| 357 | | | cos 84y | sin 84y. |
| 358 | | | cos 346y | sin 346y. |
| 359 | | | cos 83y | sin 83y. |
| 360 | | | cos 345y | sin 345y. |
| 361 | | | cos 81y | sin 81y. |
| ⋮ | ⋮ | ⋮ | ⋮ | ⋮ |
| 523 | | | cos y | sin y. |
| 524 | | | cos 263y | sin 263y. |
| 525 | (3, 525) | (5, 525) | cos 0=1 | sin 0=0. |

In the case where the video signal is blanked for 6% of the total vertical scanning cycle during retrace, the last 32 cores to switch such as the odd numbered cores corresponding to odd numbered vectors $\overline{\mathbf{461}}$–$\overline{\mathbf{525}}$ in FIGURE 9 could be omitted. To provide 360° operation alternate cores in the horizontal or vertical series of cores would have the connections to the respective graded windings on the cores reversed corresponding to shifting alternate vectors in FIGURE 9 by 180°.

The vector diagram of FIGURE 9 would rotate at 7,875 revolutions per minute for the horizontal sweep assembly corresponding to a sine wave input of 7,875 cycles per second to provide the scanning rate with respect to the horizontal sweep assembly of 15,750 lines per second, for example. Normally in the horizontal sweep assembly with 180° distribution of vectors as in FIGURE 9, present vector $\overline{\mathbf{2}}$ of the vertical sweep assembly would be vector $\overline{\mathbf{1}}$ for the horizontal sweep assembly, vector $\overline{\mathbf{4}}$ of the vertical sweep assembly would be vector $\overline{\mathbf{2}}$ for the horizontal sweep assembly and so forth since in the horizontal sweep assembly, cores 1–525 would be switched in sequence rather than interlaced as with the vertical sweep assembly. Windings 701, 801 and 401, for example, would normally directly link core 301 in FIGURE 8 in the same manner as indicated in FIGURE 1.

The embodiment of FIGURES 8 and 9 particularly is based on the concept of utilizing an alternating polarity current waveform in each of the graded series of windings. By this conception, very important results are obtained as compared with a sweep arrangement as indicated for the vertical sweep assembly in FIGURE 1. For example, with alternating polarity current waveforms, the return sweep interval such as is present between points 177 and 178 of waveform 170 in FIGURE 1 is eliminated and each switching of the cores from one polarity to the other provides a useful output for the scanning purpose. Further, residual magnetization, hysteresis, and similar types of unbalance in the magnetic elements such as is present in the case of direct current magnetization are eliminated. The peak magnetic fields in the saturated parts of the cores are greatly reduced as compared to the vertical sweep assembly of FIGURE 1 and current amplitudes, total numbers of winding turns, heating and magnetic leakage are all greatly reduced also as compared with a direct current excited graded winding system as illustrated for the vertical sweep assembly of FIGURE 1.

While the horizontal sweep assembly of FIGURE 1 eliminates the return sweep required in the vertical sweep assembly of FIGURE 1 by providing an alternating square wave bias, the use of multiphase sinusoidal currents for the system as illustrated in FIGURES 8 and 9 is still more advantageous. With the use of sinusoidal multiphase exciting currents, the display system of the present invention becomes uniquely simple and economical.

Figure 10:
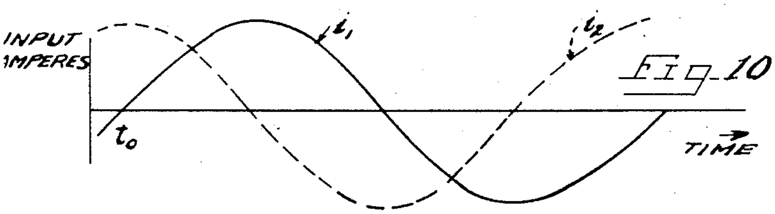
FIGURE 10 illustrates the sinusoidal waveforms for the respective series of graded windings of each sweep assembly.
Figure 11:
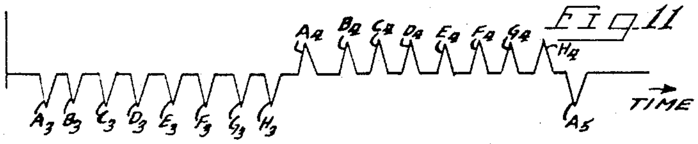
FIGURE 11 illustrates the output waveform from either the horizontal or vertical sweep assembly of FIGURE 8.
Figure 12:
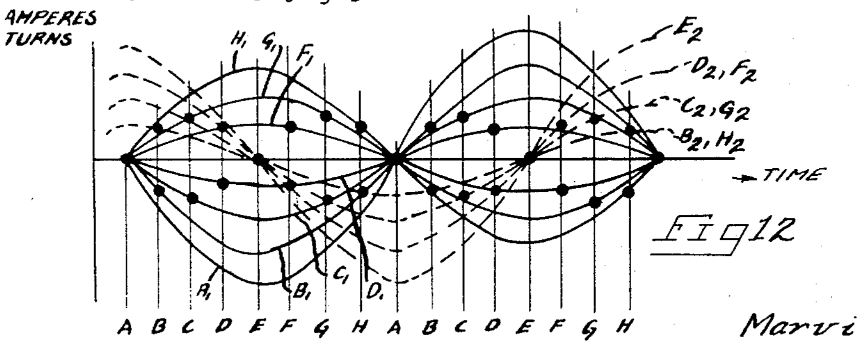
FIGURE 12 is a diagrammatic illustration of the manner in which the cores of the respective series are switched from one polarity of saturation to the opposite polarity of magnetic saturation in sequence.
Figure 14:
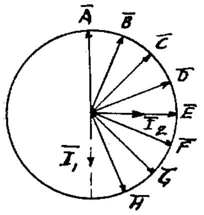
FIGURE 14 is a simplified vector diagram corresponding to the simplified illustration of FIGURE 12 which is utilized in explaining the operation of the system of FIGURE 8.

To further explain the principles of operation of the system of FIGURES 8 and 9, the views of FIGURES 10–14 may be considered which represent the operation of a scanning system of 8 cores which may be labeled A through H and whose magnetization is represented by vectors $\overline{A}$–$\overline{H}$ in FIGURE 14. The series of cores has two series of graded windings receiving current waveforms $i_1$ and $i_2$, respectively, as indicated in FIGURE 10. The first series of graded windings may be such that the current waveform $i_1$ produces magnetizing forces in the respective cores varying as indicated by waveforms $A_1$–$H_1$. It will be seen from the diagram that cores A and H would have the same number of turns but would be wound in opposite directions. Thus if core A when energized with a positive value of $i_1$ produced a clockwise magnetomotive force, the same current $i_1$ would produce a counterclockwise magnetizing force in core H. In FIGURE 12, it is considered that core E has no winding receiving the current $i_1$.

The dash waveforms in FIGURE 12 may represent the magnetizing forces in the cores resulting from excitation by current waveform $i_2$. The lowest amplitude waveform in phase with current $i_2$ may be designated $B_2$, $H_2$ since cores B and H have the lowest number of turns excited by current $i_2$. Core A may have no turns excited by current $i_2$. The next waveform is designated $C_2$, $G_2$ since it represents the variation with time of magnetizing force applied to cores C and G by current $i_2$. Similarly waveform $D_2$, $F_2$ represents the variation of magnetizing force in cores D and F, and curve $E_2$ represents the variation of magnetizing force resulting from current $i_2$ in core E.

Referring to the diagram of FIGURE 12, at the time represented by the vertical line A, magnetizing force $A_1$ which is 180° out of phase with current $i_1$ is shifting from positive to negative saturation and generates a pulse as indicated at $A_3$ in FIGURE 11 at the output winding of core A. At the next instant of time represented by line B in FIGURE 12, the magnetizing forces in core B represented by curves $B_1$ and $B_2$ are equal and opposite and core B is switching from a positive saturation value to a negative saturation value to generate pulse $B_3$ in FIGURE 11. At the instant of time represented by line C in FIGURE 12, the magnetizing forces in core C represented by curves $C_1$ and $C_2$ are equal and opposite, and core C is being switched from positive to negative saturation to generate pulse $C_3$. At the instant of time represented by vertical line D in FIGURE 12, the magnetizing forces $D_1$ and $D_2$ in core D are equal and opposite and core D is switched from positive to negative saturation to generate pulse $D_3$ in FIGURE 11. At the time represented by vertical line E in FIGURE 12, the magnetizing force represented by curve $E_2$ in core E is shifting from positive to negative to generate pulse $E_3$ at the output winding of core E. This sequence is continued in cores F, G and H to generate pulses $F_3$, $G_3$ and $H_3$, after which core A is switched from negative to positive saturation as indicated by curve $A_1$ to generate a positive pulse $A_4$. Switching of the successive cores in sequence then generates pulses $B_4$–$H_4$ and then again a negative pulse $A_5$ to begin a new cycle.

The same action can be represented by means of a vector diagram as shown in FIGURE 14 which may rotate in the counterclockwise direction as a function of time. Here the vectors $\overline{A}$–$\overline{H}$ represent the maximum magnetizing forces exerted on the cores A–H, and the horizontal components of the vectors may represent the instantaneous magnetizing forces in the respective cores as a function of time. Considering the instant time represented by $t_0$ in FIGURE 10, current $i_1$ is shifting from a negative value to a positive value and this may be represented by a current vector $\overline{I}_1$ in FIGURE 14 whose horizontal components is shifting from a negative value to a positive value and is instantaneously at zero. Similarly current $I_2$ at time $t_0$ is at a positive maximum and this is represented in the vector diagram of FIGURE 14 by the vector $\overline{I}_2$ whose horizontal component is instantaneously at a positive maximum. It will be noted that the magnetizing force vector $\overline{A}$ is 180° out of phase with respect to the current vector $\overline{I}_1$ and that the magnetizing force vector $\overline{E}$ is in phase with the current vector $\overline{I}_2$.

It is believed evident the number of turns on the cores to be selected to produce the vectors $\overline{A}$–$\overline{H}$ in FIGURE 14 with equal angles therebetween so that the cores will have the same maximum amplitude of magnetizing force applied thereto and will be switched at equal time intervals. Each vector $\overline{A}$–$\overline{H}$ can be considered to have one component in phase with current vector $I_1$ and a second component in phase with vector $I_2$. The relative magnitudes of the component vectors necessary to construct the resultant vectors $\overline{A}$–$\overline{H}$ will be proportional to the required number of turns linking the respective cores and energized by the respective exciting currents $i_1$ and $i_2$.

Thus if $T_{A_1}$ represents the number of turns linking core A and excited by current $i_1$, $T_{A_2}$ represents the number of turns linking core A and excited by current $i_2$, and so forth, it will be apparent that the following relations hold in terms of vector notation with respect to the vector diagram of FIGURE 14:

$$T_{A_2}\overline{I}_1=\overline{A} \quad (1)$$

$$T_{B_1}\overline{I}_1+T_{B_2}\overline{I}_2=\overline{B} \quad (2)$$

$$T_{C_1}\overline{I}_1+T_{C_2}\overline{I}_2=\overline{C}, \text{ etc.} \quad (3)$$

If $T_{A_1}$ is arbitrarily assigned a value of 100 and the current vectors $\overline{I}_1$ and $\overline{I}_2$ are assigned a magnitude of 1, then it will be apparent that the magnitude of the $\overline{B}$ vector times cosine $\pi/8=T_{B_1}$ times the magnitude of the current vector $\overline{I}_1$, and so forth. Since the magnitude of the $\overline{B}$ vector is 100 and the magnitude of the $\overline{I}_1$ vector is 1, $T_{B_1}=100$ cosine $\pi/8$. Similarly $T_{B_2}=100$ sine $\pi/8$. Thus, the actual number of turns to be utilized for each of the cores can be readily determined as soon as the actual maximum ampere turns to be applied to the cores has been determined either by calculation or empirically. The particular value of peak magnetizing force selected depends on the dimensions and material of the magnetic circuits, the permissible current amplitudes and other factors, as will be apparent to those skilled in the art. The manner in which Table II has been computed will be apparent from the foregoing simplified illustration.

The operation of the series of cores of FIGURE 8 can also be understood with reference to the plot of intrinsic flux density as a function of magnetizing force for the magnetic material forming the cores of FIGURE 8. Thus at the instant of time represented by time $t_0$ in FIGURE 10, core A is switching from positive saturation to negative saturation and thus is at a point corresponding to point 1101 on the hysteresis curve 1102. Cores B, C, D and E are saturated and have applied thereto progressively greater numbers of ampere turns as represented by points 1103, 1104, 1105 and 1106 on curve 1102. Cores F, G and H correspond instantaneously in magnetic condition to cores D, C, and B. At successive instants of time represented by vertical lines B, C, D and E, cores B, C, D and E will successively occupy a magnetic condition corresponding to point 1101, while core A will successively assume magnetic conditions corresponding to points 1107, 1108, 1109 and 1110 on curve 1102. After core H has been switched through point 1101, core A is switched from negative saturation to positive saturation through point 1111 on curve 1102.

While it is preferable to have the peak magnetizing forces exerted on the successive cores equal and to have the time intervals between switching of the successive cores equal, it will be apparent that operative systems may be constructed without adhering to these preferred limitations. Many modifications and variations may be effected without departing from the novel concepts of the present invention.

What I claim is:

1. An area scanning system comprising first and second series of magnetic cores, first and second series of windings for applying first and second magnetomotive forces to the cores of each series with at least the first magnetomotive forces being successively different in amplitude, said first and second magnetomotive forces applied to the first series of cores being of amplitude and wave form to cyclically switch the magnetic condition of said first series of cores in sequence, and said first and second magnetomotive forces of the second series of cores being of amplitude and wave form to switch the magnetic condition of the cores of the second series in each cycle of sequential switching of the first series of cores, and output means coupled to the first and second series of cores responsive to magnetic flux variations therein to generate electrical scanning signals capable of generating an area scanning pattern, wherein the improvement comprises:

said first and second magnetomotive forces applied to at least the second series of cores being correlated such that the successive cores are sequentially switched from positive to negative saturation during a first operative scan cycle and then are switched in the same sequence from negative to positive saturation during a second operative scan cycle without any retrace switching between successive operative scan cycles.

2. The system of claim 1 wherein alternating current wave forms are supplied to the respective series of windings of at least the second series of cores whereby each switching of the cores produces a useful electrical scanning signal without the necessity for a return sweep.

3. The system of claim 2 wherein out of phase sinusoidal wave forms are supplied to the respective series of windings of at least the second series of cores.

4. The system of claim 3 wherein the respective series of windings link the successive cores of the series with numbers of turns which produce equal time intervals between switching of the successive cores of the series during each operative scan cycle.

5. An area scanning system for producing a visual display comprising a series of vertically extending horizontally offset conductors, a series of horizontally extending vertically offset conductors, an electroluminescent material interposed between the vertically extending and horizontally extending conductors, a first series of magnetic cores having respective output windings coupled to the respective horizontally extending conductors, a second series of magnetic cores having output windings coupled to respective vertically extending conductors, first and second series of windings coupled to the cores of each series for applying first and second magnetomotive forces to the cores with at least the first magnetomotive forces exerted on the cores of each series being of successively different amplitude, said first and second magnetomotive forces of the first series of cores being of amplitude and wave form to cyclically switch the magnetic condition of said first series of cores in sequence to successively energize said horizontally extending conductors, and said first and second magnetomotive forces of the second series of cores being of amplitude and wave form to switch the magnetic condition of the cores of the second series in each cycle of sequential switching of the first series of cores to energize each of the vertically extending conductors in sequence each time one of the horizontally extending conductors is energized, wherein the improvement comprises:

said first and second magnetomotive forces applied to at least the second series of cores being correlated such that the successive cores are sequentially switched from positive to negative saturation during a first operative scan cycle and then are switched in the same sequence from negative to positive saturation during a second operative scan cycle without any retrace switching between successive operative scan cycles.

6. The system of claim 5 wherein capacitance means associate with the output windings of the cores produces an oscillatory wave train for exciting the luminescent material.

7. The system of claim 5 wherein there is a common conductor connected to one of the output terminals of each of the windings of the first and second series of cores, and the video input signal is applied between said common conductors.

8. The system of claim 7 wherein a suitable bias voltage for the luminescent material is applied between the common conductors.

References Cited

UNITED STATES PATENTS

| | | | |
|---|---|---|---|
| 2,897,405 | 7/1959 | Briggs | 315—169 |
| 2,904,626 | 9/1959 | Rajchman | 340—166 |
| 2,928,894 | 3/1960 | Rajchman | 178—7.3 |
| 3,012,095 | 12/1961 | Skellett | 340—166 |

ROBERT L. GRIFFIN, *Primary Examiner.*

J. A. ORSINO, Jr., *Assistant Examiner.*

U.S. Cl. X.R.

178—6; 313—108; 315—169; 340—166